United States Patent [19]

Hirata et al.

[11] Patent Number: 5,530,051
[45] Date of Patent: Jun. 25, 1996

[54] SYNTHETIC RESIN COMPOSITION AND METALLIC PIGMENT FOR INCORPORATION INTO SYNTHETIC RESIN

[75] Inventors: Atsushi Hirata; Kazushi Hirobe, both of Osaka, Japan

[73] Assignee: Kanegafuchi Kagaku Kabushiki Kaisha, Osaka, Japan

[21] Appl. No.: 351,582

[22] Filed: Dec. 7, 1994

[30] Foreign Application Priority Data

Dec. 8, 1993 [JP] Japan .................................. 5-307600
Dec. 21, 1993 [JP] Japan .................................. 5-321526
Dec. 28, 1993 [JP] Japan .................................. 5-338510

[51] Int. Cl.$^6$ .............................. C08J 5/10; C08K 3/08; C08L 67/00
[52] U.S. Cl. ........................ 524/441; 524/437; 524/439
[58] Field of Search .................... 524/439, 437, 524/441

[56] References Cited

U.S. PATENT DOCUMENTS 4,292,087  9/1981  Bell ..................................... 106/193 M

*Primary Examiner*—Peter A. Szekely
*Assistant Examiner*—U. K. Rajguru

*Attorney, Agent, or Firm*—Armstrong, Westerman, Hattori, McLeland & Naughton

[57] ABSTRACT

The present invention relates to a synthetic resin composition for obtaining a molded article which has a metallic appearance like the brilliance of Milky Way, and is used in OA instruments, AV instruments cameras, telephones, electric shavers, wheel caps for automobiles, vessels for cosmetics, and the like. The synthetic resin composition comprises 100 parts by weight of a thermoplastic resin, and as a metallic pigment, from 0.2 to 5 parts by weight of lustrous metal particles having an average particle diameter (maximum length) of from 50 to 800 μm, and a ratio σ/x of a standard deviation of a particle diameter (σ) to an average particle diameter (x) of 0.1 or less, or from 0.2 to 10 parts by weight of lustrous metal fine pieces having an average particle diameter of from 50 to 800 μm, and an average shape ratio (thickness/average particle diameter) of from 1/100 to 1/8. A molded article obtained from such a synthetic resin composition exhibits an excellent metallic appearance, has an extremely excellent weld appearance property, and can be used in a high-grade molded product which is complicated and is liable to cause a weld line or a flow pattern, such as chassis for OA instruments, chassis for AV instruments, exterior covers for cameras, wheel caps for automobiles, and the like, which have not been attained by the prior art.

9 Claims, 2 Drawing Sheets

LEGEND

A: GATE (TWO PORTIONS)
B: WELD GENERATION SITE

SYNTHETIC RESIN COMPOSITION AND METALLIC PIGMENT FOR INCORPORATION INTO SYNTHETIC RESIN

BACKGROUND OF THE INVENTION

1. Field of the Invention

The present invention relates to a synthetic resin composition which is used in OA instruments, AV instruments, cameras, telephones, electric shavers, wheel caps for automobiles, cosmetic vessels, and the like, and more particularly, it relates to a synthetic resin composition for producing a molded article having a metallic appearance like the brilliant Milky Way.

2. Description of the Prior Art

A conventional method is known for producing a molded article having a metallic appearance like the brilliant Milky Way by mixing a thermoplastic resin and a metal powder, and melt molding the mixture. However, where the thermoplastic resin containing the metal particles is injection-molded, a poor appearances are liable to occur such as a weld line, which is formed at the mating portion of the resins, a flow pattern of the resin or the like (hereinafter those are referred to as "weld appearance" in combination), and its usage was largely restricted. Various improved methods have been proposed against this problem. For example, JP-A-51-63847 (the term "JP-A" used herein means an unexamined published Japanese patent application) discloses a synthetic resin composition comprising 100 parts by weight of a synthetic resin and from 0.3 to 10 parts by weight of an aluminum pigment having an average particle diameter of 30 μm or less and an average shape ratio (thickness/particle size) of from 1/20 to 1. Further, JP-A-61-159453 discloses a resin molded article comprising a thermoplastic resin, and particles having a surface luster having an average particle diameter of from 35 μm to 1 mm and an average shape ratio of from 1/8 to 1 in an amount of from 0.1 to 15 parts by volume per 100 parts by volume of the sum of the thermoplastic resin and the particles having the surface luster. Those prior art intend to improve the weld appearance by using a metal powder having a large average shape ratio (thickness/particle diameter) and a shape relatively close to a spherical shape to decrease the directionality of the particles. In addition, JP-A-61-49817 discloses an improved weld appearance obtained by adjusting the particle diameter and the amount of metal particles to be added such that a composition comprises 100 parts by volume of a thermoplastic resin and from 0.1 to 20 parts by volume of the metal particles having a maximum outer diameter of from 10 μm to 1 mm and an optional shape, and the metal particles have the relationship of D≧H between an average interval D and a, weld width H.

However, the above-described conventional method using the metal particles involves a pulverization in the metal powder formation step, and therefore it cannot prevent contamination of extremely fine particles. If such extremely fine particles of a metal powder are contaminated, the extremely fine particles act just like a black pigment, whereby a blackish weld line or flow pattern are developed, and as a result, an excellent weld appearance property cannot be attained. This is just a reason why the weld appearance deteriorates as the amount of the metal powder to be added is increased. In addition, the fine particles adversely affect to darken the molded article, and if a white pigment such as titanium white is added to improve this defect, a metallic feel is decreased due to a hiding affect.

In order to minimize the amount of such metal fine particles to be contaminated, JP-A-61-241333 discloses a metallic pigment for incorporating into a synthetic resin, comprising metal fine particles having an average shape ratio (thickness/particle diameter) of from 1/25 to 1, a passing percentage of a 500 mesh Tyler standard screen of 30% or less and preferably 20% or less, and a passing percentage of a 200 mesh Tyler standard screen of 90% or more and preferably 95% or more, and the JP-A-61-241333 proposes to limit the average shape ratio of the metal powder as well as limiting sieves sizes and also to use particles mainly having a particle diameter of from 25 to 74 μm as the metal particles, However, even if this technique is used, the particle diameter distribution is wide and the contamination of metal fine particles is still unavoidable Y, the above-described defect is left unsolved. In particular, in a polyester type resin such as a filler-reinforced polyethylene terephthalate resin (hereinafter referred to as "GF-PET resin"), or an alloy resin of a polycarbonate resin (hereinafter referred to as "PC resin") end a polyethylene terephthalate resin (hereinafter referred to as "PET resin"), such problems markedly arise that a hue of a base resin becomes blackish or a weld appearance deteriorates. This is assumed, in the case where such polyester type resins are used, to be caused since a high shear must be exerted on the resins at a melt pelletization with a twin screw extruder or the like, the metal particles are further pulverized, thereby generating fine particles. In fact, when a molded article was observed with an electron microscope, extremely fine particles were observed.

In view of the above-described problems involved in the prior art, one object of the present invention is to provide a synthetic resin composition which gives an excellent weld appearance property and a brilliant metallic feel, which have not yet been attained by the prior art, to the high-grade molded products which have a complicated shape and are liable to cause a weld line or a flow pattern, such as chassis for OA instruments, chassis for AV instruments, exterior covers for cameras, wheel caps for automobiles, and the like, and which can prevent a base color from being blacked even in the case where polyester type resins are used.

Another object of the present invention is to provide a metallic pigment for incorporating into a synthetic resin to be used in the synthetic resin composition.

BRIEF SUMMARY OF THE INVENTION

The above objects of tile present invention can be attained by the following synthetic resin compositions.

The first embodiment of the synthetic resin composition according to the present invention comprises 100 parts by weight of a thermoplastic resin and as a metallic pigment, from 0.2 to 5 parts by weight of lustrous metallic particles having an average particle diameter of from 50 to 800 μm and a σ/x ratio of 0.1 or less wherein σ is a standard deviation of a particle diameter and x is an average particle diameter.

The particle diameter of the metallic particles used herein means the maximum length of the particle, and therefore, the average particle diameter used herein means the average of the maximum lengths Of the particles.

The average particle diameter of the metallic particles used in the present invention is from 50 to 800 μm. If the average particle diameter is less than 50 μm, a good weld appearance property cannot be obtained, and on the other hand, if the average particle diameter is larger than 800 μm, a metallic feel is impaired. The average particle diameter is preferably from 70 to 500 μm, and more preferably from 100 to 300 μm.

It is essential for the particle diameter distribution of the metal particles that a ratio of the average particle diameter (x) to the standard deviation (σ), that is, the σ/x ratio is 0.1 or less. If the σ/x ratio exceeds 0.1, the generation of fine particles increases, and as a result, a good weld appearance property cannot be obtained. It is better for the lower limit of the σ/x ratio to be close to zero which is the theoretical lower limit. In general, the particle diameter distribution is expressed by σ, and the distribution becomes sharp as the σ becomes small. However, judging from the point of the weld appearance property, the particle diameter distribution can be defined by σ/x, not by the respective values of x and σ. By having such a particle diameter distribution, the contamination of fine particles, which has not conventionally been avoided, can substantially be prevented, and a good weld appearance property can be obtained. The term "substantially" used herein means that the weight percent of metal particles having a particle diameter of 20 μm or less in the composition is about 5% or less. To obtain the metal particles satisfying the above-described requirements, metal particles which are the raw material are screened with a sieve, and metal particles which satisfy the desired average particle diameter (x) and standard deviation (σ) can be selected. Such metal particle can be produced by, for example, punching a metal foil. For example, a metal foil is punched with a punching machine in an optional shape. According to the procedure, a pulverization step is not required in producing metal particles, and as a result, the contamination of extremely fine particles, which has not been avoided in the conventional metal powder, can substantially be prevented.

The amount of the metal particles added is from 0.2 to 5 parts by weight per 100 parts by weight of the thermoplastic resin. If the amount of the metal particles to be added is less than 0.2 parts by weight a metallic feel is poor, and on the other hand, if the amount thereof to be added exceeds 5 parts by weight, not only a good weld appearance property is impaired, but also a mechanical strength such as an impact strength is decreased. The preferred amount of the metal particles to be added is from 0.5 to 3 parts by weight per 100 parts by weight of the thermoplastic resin.

Another embodiment of the synthetic resin composition according to the present invention comprises 100 parts by weight of a thermoplastic resin and from 0.2 to 5 parts by weight of lustrous metal fine pieces having an average particle diameter of from 50 to 800 μm, and an average shape ratio (thickness/average particle diameter) of from 1/100 to 1/8. The average particle diameter of the metal fine pieces used herein means the average of the maximum length of the fine pieces. The average particle diameter of the metal fine pieces is from 50 to 800 μm. If the average particle diameter is less than 50 μm, a hue of a molded article becomes dark and also a weld appearance property is decreased, In addition, such is not preferred from the standpoints of a punching workability and a cost. On the other hand, if the average particle diameter exceeds 800 μm, the metal fine pieces are too outstanding and a excellent metallic feel cannot be obtained. If the average particle diameter is within the range of from 50 to 800 μm, an obtained molded article shows an excellent appearance having both the metallic feel and the weld appearance property. The average particle diameter of the metal fine pieces is preferably from 70 to 500 μm, and more preferably from 100 to 300 μm.

The metal fine pieces have an average shape ratio (thickness/average particle diameter) in the range of from 1/100 to 1/8. Since the metal fine pieces mainly have a scale shape, a phenomenon mainly occurs such that the metal fine pieces are not pulverized but are folded against a shear received at the pelletization or melt molding, whereby generation of extremely fine particles can be suppressed. If the average shape ratio is smaller than 1/100, it is extremely difficult to practically use such metal fine pieces from the standpoint of the punching workability at the production of the metal fine pieces and the handling property at the use. On the other hand, if the average shape ratio is larger than 1/8, the generation of fine particles increases, whereby deterioration of a weld appearance property or blacking of a molded article undesirably occurs. If the average shape ratio is within the range of from 1/100 to 1/8, an excellent appearance having both the metallic feel and the weld appearance property is exhibited. The metal fine pieces used in the present invention are produced by punching out a metal foil, and for example, are obtained by punching out a metal foil with a punching machine into an Optional shape. According to this procedure, a pulverization step is not required in the production of the metal fine pieces, and consequently, the contamination of extremely fine particles, which has not been avoided in the use of conventional metal powder, can substantially be prevented. The term "substantially" used herein means that the weight percent of extremely fine particles having the maximum particle diameter of 20 μm or less is about 5% or less. Other procedures Such as cutting for producing the metal fine pieces may be employed if the same effect as in the punching can be obtained in the point that the contamination of extremely fine pieces can be prevented.

The amount of the metal fine pieces to be added is from 0.2 to 5 parts by weight. If the amount thereof is less than 0.2 part by weight, the metallic feel is extremely weakened, and on the other hand, if the amount thereof exceeds 5 parts by weight, the metal fine pieces are too outstanding, and as a result, an excellent metallic feel cannot be obtained. If the amount of the metal fine pieces added is within the range of from 0.2 to 5 parts by weight, an excellent appearance having both the metallic feel and the weld appearance property is exhibited. The mount of the metal fine pieces to be added is preferably from 0.5 to 3 parts by weight.

Figure 1:
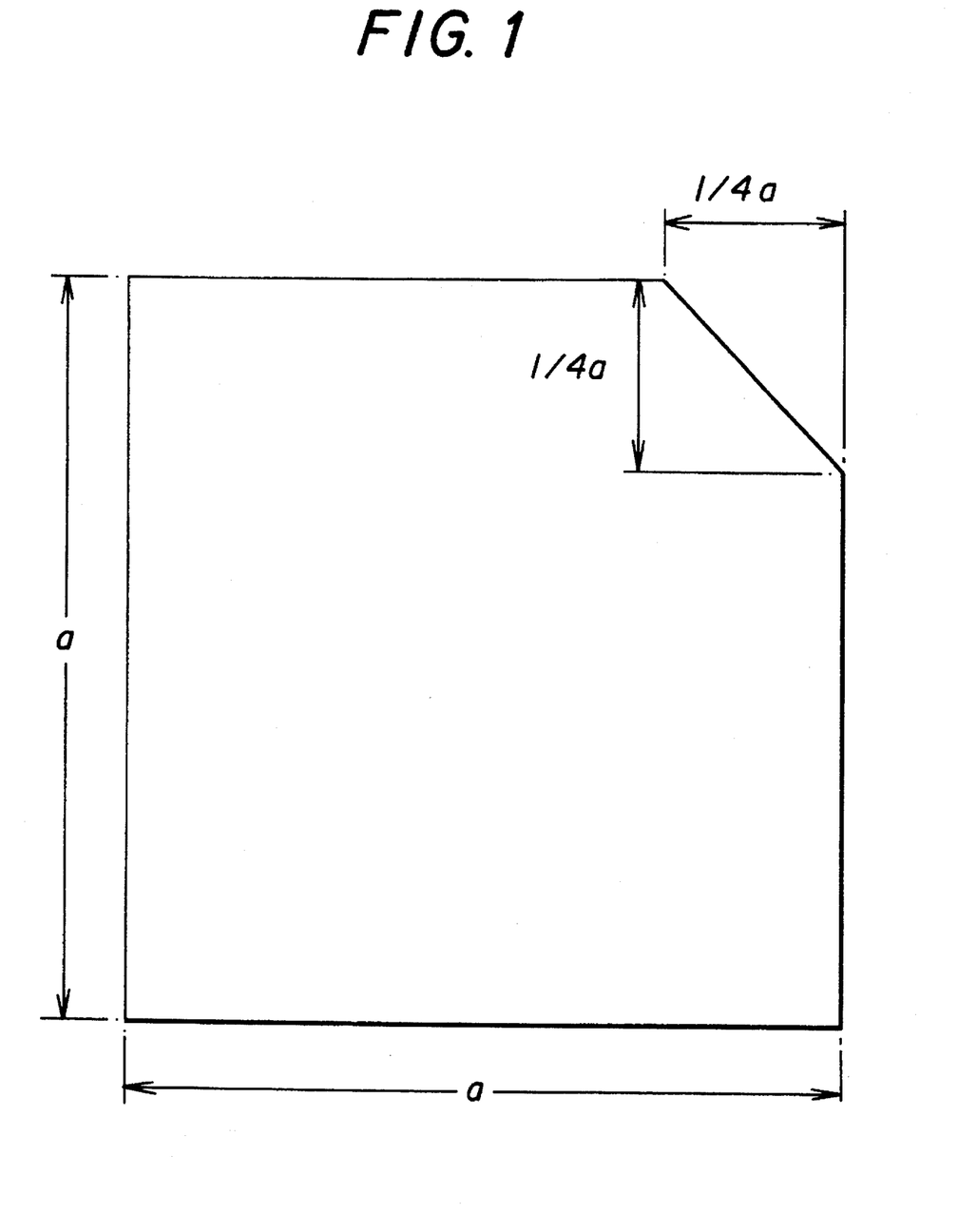
FIG. 1 is a plane view showing one example of the metal fine pieces used in the present invention.

The shape of the above-described metal particles or metal fine pieces which can be used as the metallic pigment in the present invention is not particularly limited. However, if the shape has a symmetrical shape in front and rear and in right and left like a polygon such as regular square, or a circle, a cut portion is provided at one or more portions of the peripheral area to break the symmetrical balance in front and rear or in right and left, whereby orientations of the metallic pigments in a flowing resin are liable to match, and a stronger metallic feel can be exhibited with a small amount thereof. For example, in the case of a regular square, it is convenient if a cut portion is provided at one corner thereof as shown in FIG. 1, and in the case of a circle, it is convenient if a cut portion is provided at one part of the peripheral area thereof.

Aluminum is the most preferred example as the metal for the metal particles or metal pieces used as the metallic pigment in the present invention, but copper, stainless steel, tin, and the like may be used. Further, those metals may be processed by coating a paint on the metal as a substrate, followed by baking, or by lining the substrate with a weather resistant sheet.

The metal particles or metal fine pieces which are used as the metallic pigment may further contain a plurality of particles or pieces having different particle diameters to improve the metallic feel. However, a care should be taken in this case that the weld appearance property is decreased by the difference in flows due to the different particle diameter.

The thermoplastic resin which can be used in the present invention is not particularly limited. Examples of the thermoplastic resin are acrylic resins, acrylonitrile-styrene resins (AS resin), acrylonitrile-butadiene-styrene resins (ABS resin), polystyrene resins, polyolefin resin, methacrylic resins, vinyl chloride resins, polyester resins, polyamide resins, polyacetal resins, polyphenylene oxide resins, and the like. Examples of the polyester resins are PC resins, PET resins, polybutylene terephthalate resins (hereinafter referred to as "PBT resin"), and the like. Those resins may be used as mixtures of two or more resins. Further, these resins may be used in combination of other resins. Where the thermoplastic resin used is a transparent or semi-transparent resin, a further deep excellent metallic feel can be obtained.

Furthermore, various types of colorants, fillers, stabilizers, release agents, flame retardants, and the like can be added to the resin in an amount within the range which does not impair the effect of the present invention. For example, where carbon black or the like is added to color the resin, an appearance like the Milky Way shining in the clear night sky can be obtained.

The synthetic resin composition according to the present invention is molded with, for example, an extrusion molding method, a method of melt pelletizing a composition with an extruder or the like and injection molding the pellets, or a method of directly kneading and molding a composition with an injection molding machine, thereby obtaining a metallic molded article having an excellent weld appearance property. In particular, where the injection molding is employed, it is desirable that if the thermoplastic resin and the metallic pigment are melt pelletized, the dispersibility of the metallic pigment is improved. Further, by selecting mild conditions in the melt pelletization, the pulverization of the metallic pigment is suppressed as little as possible, thereby preventing generation of fine particle, and consequently, the weld appearance property is further improved.

A molded article comprising the synthetic resin composition according to the present invention exhibits an excellent metallic appearance, and also has an extremely excellent weld appearance property. For this reason, the molded article can be used in high-grade molded products which have a complicated shape and are liable to cause a weld line or a flow pattern, such as chassis for OA instruments, chassis for AV instruments, exterior covers for camera, wheel caps for automobiles, and the like, which have not conventionally been attained.

BRIEF DESCRIPTION OF THE DRAWINGS

FIG. 2(I) is a front view showing a molded article for evaluating the weld appearance property; and FIG. 2(II) is a side view of the molded article shown in FIG. 2(I).

DETAILED DESCRIPTION OF THE PREFERRED EMBODIMENTS

The present invention is described in more detail with reference to the following examples and comparative examples. In those examples and comparative examples, the weld appearance property, the metallic feel, and the blacking of the base color hue were visually judged by molding a molded article for the evaluation of the weld appearance property shown in FIG. 2.

Figure 2A:
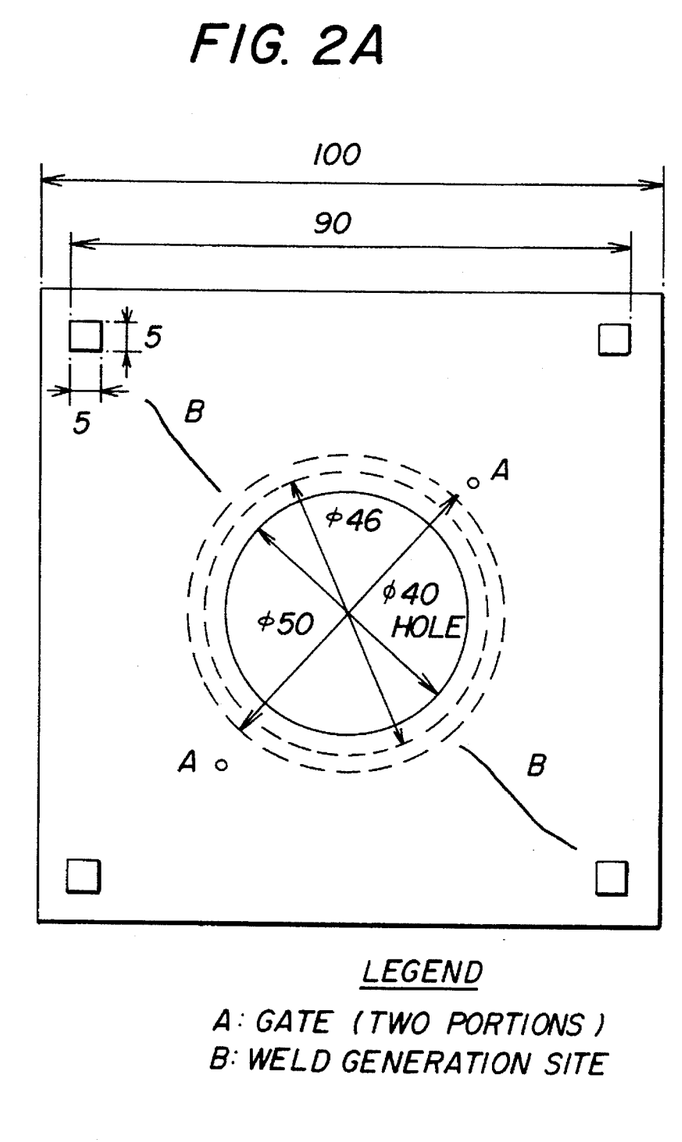
Figure 2B:
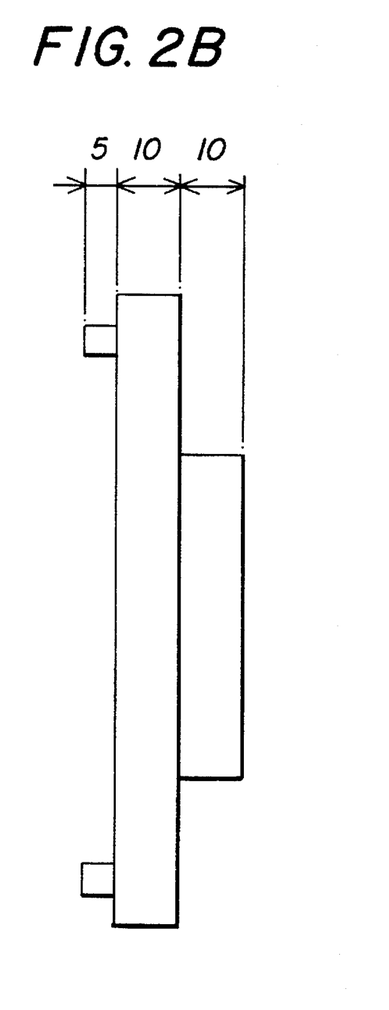

In FIG. 2, the unit for the numerical values is mm, and the wall thickness of the molded article for the evaluation is 2 mm. In FIG. 2, reference characters A and B denote a gate (two portions) and a weld generation site, respectively.

The metal particles or metal fine pieces having a cut portion at one corner of a regular square which are used in the examples have a shape as shown in FIG. 1 in which the reference character a indicates a length of one side of the regular square. Further, the thickness of the metal particle or the metal fine pieces is in the range of from 0.6 to 45 μm, and preferably from 5 to 30 μm.

The evaluation results of the appearance obtained in the examples and the comparative example are shown in Tables 1 to 6. In the Tables, o means that the weld appearance property and the metallic feel are excellent and there is no blacking in the base color, with the order being o, Δ and x.

EXAMPLE 1

100 parts by weight of a thermoplastic resin composed of a PC resin having a molecular weight determined by a solution viscosity method (20° C., methylene chloride) of 23,000 and a PET resin having a limiting viscosity (30° C., phenol/tetrachloroethane=5/5 mixed solution) of 0.6 in proportions of PC resin/PET resin=70/30 (weight ratio), and 2 parts by weight of aluminum metal particles (average particle diameter: 150 μm, σ/x ratio=0.05) were blended, and the resulting mixture was extrusion pelletized. The resulting pellets were injection-molded under the following molding conditions to obtain a molded article for the evaluation of a weld appearance property as shown in FIG. 1.

Molding Conditions

Drying of materials: 130° C., 4 hours

Cylinder temperature: 280° C., 270° C., 260° C., 240° C.

Injection pressure: 1,000 kg/cm$^2$

Mold temperature: 60°–65° C.

The thus obtained resin injection-molded article exhibited an appearance having both an extremely excellent weld appearance property and an extremely excellent metallic feel and was a product which can be used as a high-grade molded product.

EXAMPLE 2

A resin injection-molded article was obtained in the same manner as in Example 1 except that aluminum metal particles having an average particle diameter of 150 μm and a σ/x ratio=0.08 were used in place of the aluminum metal particles used in Example 1. The thus obtained resin injection-molded article exhibited an appearance having both an extremely excellent weld appearance property and an extremely excellent metallic feel, and was a product which can be used as a high-grade molded product.

Comparative Example 1

A resin injection-molded article was obtained in the same manner as in Example 1 except that aluminum metal particles having an average particle diameter of 150 μm and a σ/x ratio=0.12 were used in place of the aluminum metal particles used in Example 1. However, since the σ/x ratio of the metal particles was too large, the y obtained resin injection-molded article exhibited an appearance having an extremely excellent metallic feel, but having a poor weld appearance property, and was not a product which can be used as a high-grade molded product.

EXAMPLE 3

A resin injection-molded article was obtained in the same manner as in Example 1 except that aluminum metal particles having an average particle diameter of 80 μm and a σ/x ratio=0.04 were used in place of the aluminum metal particles used in Example 1. The thus obtained resin injection-molded article exhibited an appearance having both an excellent weld appearance property and an extremely excellent metallic feel, and was a product which can be used as a high-grade molded product.

EXAMPLE 4

A resin injection-molded article was obtained in the same manner as in Example 1 except that aluminum metal particles having an average particle diameter of 750 μm and a σ/x ratio=0.08 were used in place of the aluminum metal particles used in Example 1. The thus obtained resin injection-molded article exhibited an appearance having both an excellent weld appearance property and a sufficient metallic feel, and was a product which can be used as a high-grade molded product.

EXAMPLE 5

A resin injection-molded article was obtained in the same manner as in Example 1 except that aluminum metal particles having an average particle diameter of 500 μm and a σ/x ratio=0.07 were used in place of the aluminum metal particles used in Example 1. The thus obtained resin injection-molded article exhibited an appearance having both an extremely excellent weld appearance property and a sufficient metallic feel, and was a product which can be used as a high-grade molded product.

Comparative Example 2

A resin injection-molded article was obtained in the same manner as in Example 1 except that aluminum metal particles having an average particle diameter of 35 μm and a σ/x ratio=0.06 were used in place of the aluminum metal particles used in Example 1. However, since the metal particles had a too small particle diameter, the y obtained resin injection-molded article exhibited an appearance having an extremely excellent metallic feel, but having an extremely poor weld appearance property, and was not a product which can be used as a high-grade molded product.

Comparative Example 3

A resin injection-molded article was obtained in the same manner as in Example 1 except that aluminum metal particles having an average particle diameter of 900 μm and a σ/x ratio=0.09 were used in place of the aluminum metal particles used in Example 1. However, since the metal particles had a too large average particle diameter, the y obtained resin injection-molded article exhibited an appearance having an excellent weld appearance property, but having a poor metallic feel, and was not a product which can be used as a high-grade molded product.

EXAMPLE 6

A resin injection-molded article was obtained in the same manner as in Example 1 except that the Mount of the aluminum metal particles blended was changed to 0.5 part by Weight. The y obtained resin injection-molded article exhibited an appearance having both an extremely excellent weld appearance property and a sufficient metallic feel, and was a product which can be used as a high-grade molded product.

EXAMPLE 7

A resin injection-molded article was obtained in the same manner as in Example 1 except that the amount of the aluminum metal particles blended was changed to 4 parts by weight. The thus obtained resin injection-molded article exhibited an appearance having both an excellent weld appearance property and an extremely excellent metallic feel, and was a product which can be used as a high-grade molded product.

Comparative Example 4

A resin injection-molded article was obtained in the same manner as in Example 1 except that the amount of the aluminum metal particles blended was changed to 0.1 part by weight. However, since the amount of the metal particles added was too small, the resin injection-molded article exhibited an appearance having an extremely excellent weld appearance property, but having an extremely poor metallic feel, and was not a product which can be used as a high-grade molded product.

Comparative Example 5

A resin injection-molded article was obtained in the same manner as in Example 1 except that the amount of the aluminum metal particles blended was changed to 6 parts by weight. Since the amount of metal particles blended was too large, the resin injection-molded article exhibited an appearance having an extremely excellent metallic feel, but having an extremely poor weld appearance property, and was not a product which can be used as a high-grade molded product.

The results obtained in Examples 1 to 7 and Comparative Examples 1 to 5 are shown in Table 1 below.

TABLE 1

| | | Metal particles | | | | |
| --- | --- | --- | --- | --- | --- | --- |
| | Resin | Average particle diameter (μm) | σ/x ratio | Amount added (parts by weight) | Weld appearance property | Metallic feel |
| Example | | | | | | |
| 1 | PC/PET = | 150 | 0.05 | 2 | ⊙ | ⊙ |

TABLE 1-continued

| | Resin | Metal particles Average particle diameter (μm) | σ/x ratio | Amount added (parts by weight) | Weld appearance property | Metallic feel |
|---|---|---|---|---|---|---|
| 2 | 70/30 | 150 | 0.08 | 2 | ⊙ | ⊙ |
| 3 | | 80 | 0.04 | 2 | ○ | ⊙ |
| 4 | | 750 | 0.08 | 2 | ○ | ○ |
| 5 | | 500 | 0.07 | 2 | ⊙ | ○ |
| 6 | | 150 | 0.05 | 0.5 | ⊙ | ○ |
| 7 | | 150 | 0.05 | 4 | ○ | ⊙ |
| Comparative Example | | | | | | |
| 1 | PC/PET = 70/30 | 150 | 0.12 | 2 | △ | ⊙ |
| 2 | | 35 | 0.06 | 2 | x | ⊙ |
| 3 | | 900 | 0.09 | 1 | ○ | △ |
| 4 | | 150 | 0.05 | 0.1 | ⊙ | x |
| 5 | | 150 | 0.05 | 6 | x | ⊙ |

EXAMPLE 8

A resin injection-molded article was obtained in the same manner as in Example 1 except that the thermoplastic resin was changed to an ABS resin (intrinsic viscosity of methyl ethyl ketone soluble component=0.6 dl/g; 30° C., N,N'-dimethylformamide solution) and the injection molding was conducted under the following molding conditions.

Molding Conditions
Drying of materials: 100° C. 3 hours
Cylinder temperature: 260° C., 250° C., 240° C., 230° C.
Injection pressure: 1,200 kg/cm²
Mold temperature: 50°–55° C.

EXAMPLE 9

A resin injection-molded article was obtained in the same manner as in Example 1 except that the PC resin was changed to a PBT resin having a relative viscosity of 0.6 and the injection molding was conducted under the following molding conditions.

Molding Conditions
Drying of material: 130° C., 4 hours
Cylinder temperature: 270° C., 260° C., 250° C., 240° C.
Injection pressure: 900 kg/cm²
Mold temperature: 65°–75° C.

EXAMPLE 10

A resin injection-molded article was obtained in the same manner as in Example 1 except that the thermoplastic resin was all changed to the PC resin as used in Example 1 and the injection molding was conducted under the following molding conditions.

Molding Conditions
Drying of materials: 120° C., 6 hours
Cylinder temperature: 290 C., 280° C., 270° C., 260° C.
Injection pressure: 1,200 kg/cm²
Mold temperature: 80°–8.5° C.

EXAMPLE 11

A resin injection-molded article was obtained in the same manner as in Example 1 except that the thermoplastic resin was changed to polyamide 66 resin (MARANYL A144, a product of Unitica Ltd.) and the injection molding was conducted under the following molding conditions.

Molding Conditions
Drying of materials: 80° C., 12 hours
Cylinder temperature: 280° C., 270° C., 260° C., 250° C.
Injection pressure: 900 kg/cm²
Mold temperature: 80°–85° C.

The results obtained in Examples 8 to 11 are shown in Table 2 below.

TABLE 2

| Example | Resin | Metal particles Average particle diameter (μm) | σ/x ratio | Amount added (parts by weight) | Weld appearance property | Metallic feel |
|---|---|---|---|---|---|---|
| 8 | ABS = 100 | 150 | 0.05 | 2 | ⊙ | ○ |
| 9 | PBT/PET = 70/30 | 150 | 0.05 | 2 | ○ | ⊙ |
| 10 | PC = 100 | 150 | 0.05 | 2 | ⊙ | ⊙ |
| 11 | Polyamide 66 = 100 | 150 | 0.05 | 2 | ○ | ○ |

It is apparent from the results of Examples 8 to 11 shown in Table 2 above that even where any thermoplastic resin was used, the obtained molded article exhibited an appearance having both an excellent weld appearance property and an excellent metallic feel, and was a product which can be used as a high-grade molded product.

EXAMPLE 12

1 part by weight of punched aluminum pieces (average particle diameter=283 μm, particle diameter range=272–294 μm, σ/x=0.01) having an average shape ratio of 1/20 and a cut portion at one corner of a square having a side of 200 μm was added to 100 parts by weight of a thermoplastic resin of the PC resin and the PET resin as used in Example 1 in the proportion of PC resin/PET resin=70/30 (weight ratio) to prepare a resin composition, and the resulting resin composition was injection-molded under the following molding conditions.

Molding Conditions

Drying of materials: 130° C., 4 hours

Cylinder temperature: 270° C., 270° C., 260° C., 240° C.

Injection pressure: 1,000 kg/cm$^2$

Mold temperature: 60°–65° C.

The obtained molded article exhibited an appearance having both a sufficient metallic feel and an extremely excellent weld appearance property, and was a product which can be used as a high-grade molded product.

EXAMPLE 13

A molded article was obtained in the same manner as in Example 12 except that the amount of the punched aluminum fine pieces added was changed to 2 parts by weight, The obtained molded article exhibited an appearance having both an extremely excellent metallic feel and an extremely excellent weld appearance property, and was a product which can be used as a high-grade molded product.

EXAMPLE 14

A molded article was obtained in the same manner as in Example 12 except that the amount of the punched aluminum fine pieces added was changed to 8 parts by weight. The obtained molded article exhibited an appearance having both an extremely excellent metallic feel and an excellent weld appearance property, and was a product which can be used as a high-grade molded product.

EXAMPLE 15

A molded article was obtained in the same manner as in Example 12 except that the punched aluminum fine pieces used were changed to punched almuinum fine pieces having an average shape ratio of 1/20 and a cut portion at One corner of a square having a side of 100 μm (an average particle diameter 141 μm, particle diameter range=135–147 μm, σ/x=0.01), and the amount thereof added was changed to 0.5 part by weight. The obtained molded article exhibited an appearance having both a sufficient metallic feel and an extremely excellent weld appearance property, and was a product which can be used as a high-grade molded product.

EXAMPLE 16

A molded article was obtained in the same manner as in Example 12 except that the punched aluminum fine pieces used were changed to punched aluminum fine pieces having an average shape ratio of 1/20 and a cut portion at one corner of a square having a side of 50 μm (average particle diameter 71 μm, particle diameter range =68–74 μm, σ/x=0.01), and the amount thereof added was changed to 3 parts by weight. The obtained molded article exhibited an appearance having both an extremely excellent metallic feel and an excellent weld appearance property, and was a product which can be used as a high-grade molded product.

EXAMPLE 17

A molded article was obtained in the same manner as in Example 12 except that the punched aluminum fine pieces used were changed to punched aluminum fine pieces having an average shape ratio of 1/20 and in the form of a square having a side of 200 μm (having no cut portion)(average particle diameter 283 μm, particle diameter range=272–294 μm, σ/x=0.01), and the amount thereof added was changed to 2 parts by weight. The obtained molded article exhibited an appearance having both a sufficient metallic feel and an extremely excellent weld appearance property, and was a product which can be used as a high-grade molded product.

EXAMPLE 18

A molded article was obtained in the same manner as in Example 12 except that the punched aluminum fine pieces used were changed to punched aluminum fine pieces having an average shape ratio of 1/20 and in the form of a circle (no cut portion) having a diameter of 80 μm (particle diameter range 77–83 μm, σ/x=0.01), and the amount thereof added was changed to 2 parts by weight. The obtained molded article exhibited an appearance having both a sufficient metallic feel and an excellent weld appearance property and was a product which can be used as a high-grade molded product.

EXAMPLE 19

A molded article was obtained in the same manner as in Example 12 except that the punched aluminum fine pieces used were changed to punched stainless steel fine pieces having an average shape ratio of 1/20 and in the form of a square (no cut portion) having a side of 200 μm (average particle diameter 283 μm, particle diameter range=272–294 μm, σ/x=0.01), and the amount thereof added was changed to 2 parts by weight. The obtained molded article exhibited an appearance having both a sufficient metallic feel and an excellent weld appearance property, and was a product which can be used as a high-grade molded product.

EXAMPLE 20

2 parts by weight of punched aluminum fine pieces having an average shape ratio of 1/20 and having a cut portion at one corner of a square having a side of 500 μm (average particle diameter 707 μm, particle diameter range=690–720 μm, σ/x=0.01) were added to 100 parts by weight of the PET resin as used in Example 1 to prepare a resin Composition, and the resulting resin composition was injection-molded with an injection molding machine under the following molding conditions.

Molding Conditions

Drying of molding: 140° C., 4 hours

Cylinder temperature: 280° C., 270° C., 260° C., 250° C.

Injection pressure: 1,100 kg/cm$^2$

Mold temperature: 130°–135° C.

The obtained molded article exhibited an appearance having both a sufficient metallic feel and an excellent weld appearance property, and was a product which can be used as a high-grade molded product.

EXAMPLE 21

2 parts by Weight of punched aluminum fine pieces having an average shape ratio of 1/20 and having a cut portion at one corner of a square having a side of 200 μm (an average particle diameter 283 μm, particle diameter range= 272–294 μm, σ/x=0.01) were added to 100 parts of a thermoplastic resin composed of the PBT resin and the PET resin as used in the above-described Examples in the proportion of PBT resin/PET resin=70/30 (weight ratio) to prepare a resin composition, and the resulting composition was injection-molded under the following molding conditions.

Molding Conditions

Drying of materials: 130° C., 4 hours

Cylinder temperature: 270° C., 260° C., 250° C., 240° C.

Injection pressure: 900 kg/cm$^2$

Mold temperature: 65°–75° C.

The obtained molded article exhibited an appearance having both a sufficient metallic feel and an excellent weld appearance property, and was a product which can be used as a high-grade molded product.

EXAMPLE 22

2 parts by weight of punched aluminum fine pieces having an average shape ratio of 1/20 and having a cut portion at one corner of a square having a side of 200 μm (average particle diameter 283 μm, particle diameter range=272–294 μm, σ/x=0.01) were added to 100 parts by weight of the above-described ABS resin to prepare a resin composition, and the resulting resin composition was injection-molded with an injection molding machine under the following molding conditions.

Molding Conditions

Drying of materials: 100° C., 3 hours

Cylinder temperature: 260° C., 250° C., 240° C., 230° C.

Injection pressure: 1,200 kg/cm$^2$

Mold temperature: 50°–55° C.

The obtained molded article exhibited an appearance having both a sufficient metallic feel and an extremely excellent weld appearance property, and was a product which can be used as a high-grade molded product.

EXAMPLE 23

2 parts by weight of punched aluminum fine pieces having an average shape ratio of 1/20 and having a cut portion at one corner of a square having a side of 200 μm (average particle diameter 283 μm, particle diameter range=272–294 μm, σ/x=0.01) were added to 100 parts by weight of a thermoplastic resin composed of an ABS resin (intrinsic viscosity of methyl ethyl ketone soluble component=0.51 dl/g, 30° C., N,N'-dimethylformamide solution and a PVC resin (degree of polymerization=600) in the proportion of ABS resin/PVC resin=50/50 (weight ratio) to prepare a resin composition, and the resulting resin composition was injection-molded with an injection molding machine under the following molding conditions.

Molding Conditions

Drying of materials: 80° C., 3 hours

Cylinder temperature: 180° C., 170° C., 160° C., 160 ° C.

Injection pressure: 1,200 kg/cm$^2$

Mold temperature: 50°–55° C.

The obtained molded article exhibited an appearance having both a sufficient metallic feel and an extremely excellent weld appearance property, and was a product which can be used as a high-grade molded product.

Comparative Example 6

A molded article was obtained in the same manner as in Example 17 except that the amount of the punched aluminum fine pieces added was changed to 0.1 part by weight. The obtained molded article exhibited, an appearance having an extremely excellent weld appearance property, but having an extremely weak metallic feel, and was not a product which can be used as a high-grade molded product. It was apparent from this fact that if the amount of metal fine pieces to be added is too small, the metallic feel of a molded article becomes weak.

Comparative Example 7

A molded article was obtained in the same manner as in Example 17 except that the amount of the punched aluminum fine pieces added was changed to 12.0 parts by weight. The obtained molded article exhibited an appearance having an excellent metallic feel, but having a poor weld appearance property, and was not a product which can be used as a high-grade molded product. It was apparent from this fact that if the amount of the metal fine pieces to be added is too large, the weld appearance property of a molded article deteriorates.

Comparative Example 8

A molded article was obtained in the same manner as in Example 17 except that the punched aluminum fine pieces used were changed to punched aluminum fine pieces having an average shape ratio of 1/40 and in the form of a square having a side of 30 μm (average particle diameter 42 μm, particle diameter range=40–44 μm, σ/x =0.01), and the amount thereof added was changed to 5.0 parts by weight.

The obtained molded article exhibited an appearance having an extremely excellent metallic feel, but having a poor weld appearance property, and was not a product which can be used as a high-grade molded product. It was apparent from this fact that if the average particle diameter of the metallic fine pieces is too small, the weld appearance property of an molded article deteriorates.

Comparative Example 9

A molded article was obtained in the same manner as in Example 17 except that the punched aluminum fine pieces used were changed to punched aluminum fine pieces having am average shape ratio of 1/40 and in the form of a square having a side of 700 μm (average particle diameter 990 μm, particle diameter range=968–1,090 μm, σ/x=0.01), and the Mount thereof added was changed to 2.0 parts by weight. The obtained molded article exhibited an appearance having an extremely excellent weld appearance property, but having no high-grade feel due to a too remarkable metal fine pieces, and was not a product which can be used as a high-grade molded product. It was apparent from this fact that if the average particle diameter of the metal fine pieces is too large, the metallic feel of a molded article deteriorates.

Comparative Example 10

A molded article was obtained in the same manner as in Example 12 except that the punched aluminum fine pieces used were changed to pulverized aluminum powder having an average shape ratio of 1/12, an average particle diameter of 90 μm, and a particle diameter range (A) shown below (σ/x=0.29), and the amount thereof added was changed to 0.5 part by weight. The obtained molded article exhibited an appearance having an excellent weld appearance property, but having a poor metallic feel, and was not a product which can be used as a high-grade molded product.

| Particle diameter range (A) of aluminum powder | (σ/x = 0.29) |
|---|---|
| 150–110 μm | 18.3% |
| 110–80 μm | 46.3% |
| 80–59 μm | 23.9% |
| 59–43 μm | 8.1% |
| 43–31 μm | 2.5% |
| 31–23 μm | 0.6% |
| 23–17 μm | 0.3% |

Comparative Example 11

A molded article was obtained in the same manner as in Example 12 except that the pulverized aluminum powder as used in Comparative Example 10 was added in an amount of 1.0 part by weight in place of the punched aluminum fine pieces. The obtained molded article exhibited an appearance having a poor weld appearance property and a poor metallic feel, and Was not a product which can be used as a high-grade molded product.

Comparative Example 12

A molded article was obtained in the same manner as in Example 12 except that pulverized aluminum powder having an average shape ratio of 1/10, an average particle diameter of 55 μm, and a particle diameter range (B) shown below (σ/x=0.43) were added in an amount of 1.0 part by weight in place of the punched aluminum fine pieces. The obtained molded article exhibited an appearance having a poor weld appearance property and a poor metallic feel, and was not a product which can be used as a high-grade molded product.

| Particle diameter range (B) of aluminum powder | (σ/x = 0.43) |
|---|---|
| 150–110 μm | 1.2% |
| 110–80 μm | 13.5% |
| 80–59 μm | 27.9% |
| 59–43 μm | 26.5% |
| 43–31 μm | 16.3% |
| 31–23 μm | 7.7% |
| 23–17 μm | 3.8% |
| 17–12 μm | 1.9% |
| 12–9 μm | 0.7% |
| 9– μm | 0.5% |

Comparative Example 13

A molded article was obtained in the same manner as in Example 12 except that the pulverized powder as used in Comparative Example 12 was added in an amount of 3.0 parts by weight in place of the punched aluminum fine pieces. The obtained molded article exhibited an appearance having an extremely excellent metallic feel, but having an extremely poor weld appearance property, and was not a product which can he used as a high-grade molded product.

Comparative Example 14

A molded article was obtained in the same manner as in Example 22 except that the pulverized aluminum powder as used in Comparative Example 10 was added in an amount of 0.5 part by weight in place of the punched aluminum fine pieces. The obtained molded article exhibited an appearance having an excellent weld appearance property, but having an extremely weak metallic feel, and was not a product which can be used as a high-grade molded product.

The results obtained in Examples 12 to 23 above are shown in Table 3 below, and the results obtained in Comparative Examples 6 to 14 above are shown in Table 4 below.

It is apparent from the results of Comparative Examples 10 to 14 that where a pulverized metal powder is used, the weld appearance property or the metallic feel of a molded article deteriorates.

TABLE 3

| Example: | Resin | Material and shape | Metal fine pieces Average particle diameter (μm) | Average shape ratio | σ/x ratio | Amount added (parts by weight) | Weld appearance property | Metallic feel |
|---|---|---|---|---|---|---|---|---|
| 12 | PC/PET = 70/30 | Aluminum Square* | 283 | 1/20 | 0.01 | 1.0 | ⊙ | ○ |
| 13 | PC/PET = 70/30 | Aluminum Square* | 283 | 1/20 | 0.01 | 2.0 | ⊙ | ⊙ |
| 14 | PC/PET = 70/30 | Aluminum Square* | 283 | 1/20 | 0.01 | 8.0 | ○ | ⊙ |
| 15 | PC/PET = 70/30 | Aluminum Square* | 141 | 1/40 | 0.01 | 0.5 | ⊙ | ○ |
| 16 | PC/PET = 70/30 | Aluminum Square* | 71 | 1/20 | 0.01 | 3.0 | ○ | ⊙ |
| 17 | PC/PET = 70/30 | Aluminum Square | 283 | 1/20 | 0.01 | 2.0 | ⊙ | ○ |
| 18 | PC/PET = 70/30 | Aluminum Circle | 80 | 1/20 | 0.01 | 2.0 | ○ | ○ |
| 19 | PC/PET = 70/30 | Stainless Square | 283 | 1/20 | 0.01 | 2.0 | ○ | ○ |
| 20 | PET = 100 | Aluminum Square* | 707 | 1/20 | 0.01 | 2.0 | ○ | ○ |
| 21 | PBT/PET = 70/30 | Aluminum Square* | 283 | 1/20 | 0.01 | 2.0 | ○ | ○ |
| 22 | ABS = 70/30 | Aluminum Square* | 283 | 1/20 | 0.01 | 2.0 | ⊙ | ○ |
| 23 | ABS/PVC = 50/50 | Aluminum Square* | 283 | 1/20 | 0.01 | 2.0 | ⊙ | ○ |

*Having a cut portion at one corner

TABLE 4

| Compar-ative Example: | Resin | Material and shape | Metal fine pieces Average particle diameter (μm) | Average shape ratio | σ/x ratio | Amount added (parts by weight) | Weld appearance property | Metallic feel |
|---|---|---|---|---|---|---|---|---|
| 6 | PC/PET = 70/30 | Aluminum Square | 283 | 1/20 | 0.01 | 0.1 | ⊙ | x |
| 7 | PC/PET = 70/30 | Aluminum Square | 283 | 1/20 | 0.01 | 12.0 | Δ | ο |
| 8 | PC/PET = 70/30 | Aluminum Square | 42 | 1/40 | 0.01 | 5.0 | Δ | ο |
| 9 | PC/PET = 70/30 | Aluminum Square | 990 | 1/40 | 0.01 | 2.0 | ⊙ | x |
| 10 | PC/PET = 70/30 | Aluminum Pulverized Product | 90 | 1/12 | 0.29 | 0.5 | ο | Δ |
| 11 | PC/PET = 70/30 | Aluminum Pulverized Product | 90 | 1/12 | 0.29 | 1.0 | Δ | Δ |
| 12 | PC/PET = 70/30 | Aluminum Pulverized Product | 55 | 1/10 | 0.43 | 1.0 | Δ | Δ |
| 13 | PC/PET = 70/30 | Aluminum Pulverized Product | 55 | 1/10 | 0.43 | 3.0 | x | ⊙ |
| 14 | ABE = 100 | Aluminum Pulverized Product | 90 | 1/12 | 0.29 | 0.5 | ο | x |

EXAMPLE 24

1 part by weight of punched aluminum fine piece having an average shape ratio of 1/10 and having a cut portion at one corner of a square having a side of 200 μm (average particle diameter 283 μm, particle diameter range=270–295 μm, σ/x=0.01) was added to 100 parts by weight of a resin obtained by blending 0.5 part by weight of a phosphite type stabilizer and 0.4 part by weight of MBS resin with the above-described PC resin and PET resin (PC resin/PET resin=70/30 in weight ratio) to prepare a resin composition, and the resulting resin composition was injection-molded with an injection molding machine under the following molding conditions.

Molding Conditions

Drying of materials: 130° C., 4 hours

Cylinder temperature: 270° C., 270° C., 260° C., 240° C.

Injection pressure: 1,000 kg/cm²

Mold temperature: 60°–65° C.

The obtained molded article exhibited an appearance having both a sufficient metallic feel and an extremely excellent weld appearance property, and also having no blacking of the base hue, and was a product which can be used as a high-grade molded product.

EXAMPLE 25

A molded article was obtained in the same manner as in Example 24 except that the average shape ratio of the punched aluminum pieces (particle diameter range=272–294 μm, σ/x=0.01) and the amount to be added were changed to 1/20 and 0.4 parts by weight, respectively. The obtained molded article exhibited an appearance having both a sufficient metallic feel and an extremely excellent weld appearance property, and having no blacking of the base hue, and was a product which can be used as a high-grade molded product.

EXAMPLE 26

A molded article was obtained in the same manner as in Example 24 except that the average shape ratio of the punched aluminum pieces (particle diameter range= 273–293 μm, σ/x=0.01) was changed to 1/90, The obtained molded article exhibited an appearance having both an extremely excellent metallic feel and an extremely excellent weld appearance property, and having no blacking of the base hue, and was a product which can be used as a high-grade molded product.

EXAMPLE 27

A molded article was obtained in the same manner as in Example 24 except that the punched aluminum fine pieces used were changed to punched aluminum fine pieces having an average shape ratio of 1/20 and a cut portion at one corner of a square having a side of 100 μm (average particle diameter 141 μm, particle diameter range =135–147 μm. σ/x=0.01). The obtained molded article exhibited an appearance having both a sufficient metallic feel and an extremely excellent weld appearance property, and also having no blacking of the base hue, and was a product which can be used as a high-grade molded product.

EXAMPLE 28

A molded article was obtained in the same manner as in Example 24 except that the punched aluminum fine pieces used were changed to punched aluminum fine pieces having an average shape ratio of 1/90 and in the form of a square having a side of 200 μm (having no cut portion) (an average particle diameter 283 μm, a particle diameter range= 270–295 μm, σ/x=0.01). The obtained molded article exhibited an appearance having both a sufficient metallic feel and an extremely excellent weld appearance property, and also having no blanking of the base hue, and was a product which can be used as a..high-grade molded product.

EXAMPLE 29

A molded article was obtained in the same manner as in Example 24 except that the punched aluminum fine pieces used were changed to punched aluminum pieces having an average shape ratio of 1/60 and in the form of circle (having no cut portion) having a diameter of 100 μm (particle diameter range=96–104 μm, σ/x=0.01). The obtained molded article exhibited an appearance having both a sufficient metallic feel and an excellent weld appearance property, and having no blacking of the base hue, and was a product which can be used as a high-grade molded product.

EXAMPLE 30

A molded article was obtained in the same manner as in Example 24 except that the punched metal fine pieces used were changed to punched stainless steel fine pieces having an average shape ratio of 1/40 in the form a square (having no cut portion) having a side of 200 μm (average particle diameter 283 μm, particle diameter range=272–296 μm, σ/x=0.01). The obtained molded article exhibited an appearance having both a sufficient metallic feel and an excellent weld appearance property, and also having no blacking of the base hue, and was a product which can be used as a high-grade molded product.

EXAMPLE 31

A molded product was obtained in the same manner as in Example 27 except that the thermoplastic resin used was changed to PC/PET =85/15 (weight ratio). The obtained molded article exhibited an appearance having both a sufficient metallic feel and an extremely excellent weld appearance property, and also having no blacking of the base hue, and was a product which can be used as a high-grade molded product.

EXAMPLE 32

A molded article was obtained in the same manner as in Example 27 except that the thermoplastic resin used was changed to PC/PET =30/70 (weight ratio). The obtained molded article exhibited an appearance having both a sufficient metallic feel and an extremely excellent weld appearance property, and also having no blacking of the base hue, and was a product which can be used as a high-grade molded product.

EXAMPLE 33

2 parts by weight of punched aluminum fine particle having an average shape ratio of 1/20 and having a cut portion at one corner of a square having a side of 500 μm (average particle diameter 707 μm, particle diameter range= 690–720 μm, σ/x=0.01) were added to 100 parts by weight of a resin obtained by blending 15 parts by weight of GF(glass fiber), 0.4 part by weight of a phenol type stabilizer, 0.2 part by weight of a phosphite type stabilizer, and 0.2 part by weight of a nucleating agent with 84.2 parts by weight of the PET resin to prepare a resin composition, and the resulting resin composition was injection-molded with an injection molding machine under the following molding conditions.

Molding Conditions

Drying of materials: 140° C., 4 hours

Cylinder temperature: 280° C., 270° C., 260° C., 250° C.

Injection pressure: 1,100 kg/cm$^2$

Mold temperature: 130°–135° C.

The obtained molded article exhibited an appearance having both a sufficient metallic feel and an excellent weld appearance property, and also having no blacking of the base hue, and was a product which can be used as a high-grade molded product.

EXAMPLE 34

3 parts by Weight of punched aluminum fine pieces having an average shape ratio of 1/20 and a cut portion at one corner of a square having a side of 200 μm (average particle diameter 283 μm, particle diameter range=272–294 μm, σ/x=0.01) were added to 100 parts by weight of a resin obtained by blending 15 parts by weight of GF (glass fiber), and 0.4 parts by weight of a phosphite type stabilizer with 84.6 parts by weight of a mixture of PET resin/PBT resin= 30/70 (weight ratio) to prepare a resin composition, and the resulting resin composition was injection-molded with an injection molding machine under the following molding conditions.

Molding Conditions

Drying of materials: 130° C., 4 hours

Cylinder temperature: 270° C., 270° C., 260°, 240° C.

Injection pressure: 900 kg/cm$^2$

Mold temperature: 65°–70° C.

The obtained molded article exhibited an appearance having both a sufficient metallic feel and an excellent weld appearance property, and also having no blacking of the base hue, and was a product which can be used as a high-grade molded product.

Comparative Example 15

A molded article was obtained in the same manner as in Example 27 except that the average shape ratio of the punched aluminum fine pieces (particle diameter range= 135–148 μm, σ/x=0.01) was changed to 1/5. The obtained molded article exhibited an appearance having a sufficient metallic feel and an excellent weld appearance property, but having large blacking of the base hue, and was not a product which can be used as a high-grade molded product. It is apparent from this fact that if the average shape ratio of metal fine pieces is too large, the base hue becomes b lack.

Comparative Example 16

A molded article was obtained in the same manner as in Example 28 except that the amount of the punched aluminum fine pieces added was changed to 0.1 part by weight. The obtained molded article exhibited an appearance having an extremely excellent weld appearance, property and having no blacking of the base hue, but having an extremely weak metallic feel, and was not a product which can be used: as a high-grade molded product. It is apparent from this fact that if the amount of the metal fine pieces added is too small, the metallic feel becomes poor.

Comparative Example 17

A molded article was obtained in the same manner as in Example 28 except that the amount of the aluminum fine pieces added was changed to 12.0 parts by weight. The obtained molded article exhibited an appearance having an excellent metallic feel, but having a poor weld appearance property and a large blacking of the base hue, and was not a product which can he used as a high-grade molded product. It is apparent from this fact that if the amount of the metal fine pieces added is too large, not only the weld appearance property becomes poor, but also the blacking of the base hue causes.

Comparative Example 18

A molded article was obtained in the same manner as in Example 28 except that the punched aluminum fine pieces used were changed to punched aluminum fine pieces in the form of a square having a side of 50 μm (average particle diameter 71 μm, particle diameter range=68–74 μm, σ/x=0.01), and the amount thereof added was changed to 6.0 parts by weight. The obtained molded article exhibited an appearance having an extremely excellent metallic feel, but having a poor weld appearance property and a large blacking of the base hue, and was not a product which can be used as a high-grade molded product. It is apparent from this fact that if the amount of the metal fine pieces added is too large, a poor weld appearance property and a blacking of the base hue cause.

Comparative Example 19

A molded article was obtained in the same manner as in Example 28 except that the punched aluminum fine pieces used were changed to punched aluminum fine pieces in the form of a square having a side of 700 μm (average particle diameter 990 μm, particle diameter range=968–1090 μm, σ/x=0.01), and the amount thereof added was changed to 1.0 part by weight. The obtained molded article exhibited an appearance having an extremely excellent weld appearance property and having no blacking of the base hue, but having no high-grade feel due to remarkable metal fine pieces, and was not a product which can be used as a high-grade molded product. It is apparent from this fact that if the average particle diameter of the metal fine pieces is too large, the metallic feel becomes poor.

Comparative Example 20

A molded article was obtained in the same manner as in Example 24 except that the punched aluminum fine pieces used were changed to pulverized aluminum powder (average shape ratio 1/12, average particle diameter 90 μm, particle diameter range (A) (σ/x=0.29), and the amount thereof added was changed to 0.2 part by weight. The obtained molded article exhibited an appearance having an excellent weld appearance property and having no blacking of the base hue, but having an extremely weak metallic feel, and was not a product which can be used as a high-grade molded product.

Comparative Example 21

A molded article was obtained in the same manner as in Example 24 except that 1.0 part by weight of pulverized aluminum powder (average shape ratio 1/12, average particle diameter 90 μm, particle diameter range (A) (σ/x=0.29) was added in place of the punched aluminum fine pieces. The obtained molded article exhibited an appearance having a poor weld appearance property, a poor metallic feel, and a large blacking of the base hue, and was not a product which can be used as a high-grade molded product.

Comparative Example 22

A molded article was obtained in the same manner as in Example 24 except that 1.0 part by weight of pulverized aluminumpowder (average shape ratio 1/10, average particle diameter 55 μm, particle diameter range (B) (σ/x=0.43)) was added in place of the punched aluminum fine pieces. The obtained molded article exhibited an appearance having a poor weld appearance property, a poor metallic feel, and a large blacking of the base hue, and was not a product which can be used as a high-grade molded product.

Comparative Example 23

A molded article was obtained in the same manner as in Example 24 except that 3.0 parts by weight of pulverized aluminum powder (average shape ratio 1/10, average particle diameter 55 μm, particle diameter range (A) (σ/x=0.29)) were added in place of the punched aluminum fine pieces. The obtained molded article exhibited an appearance having a sufficient metallic feel, but having an extremely large blacking of the base hue and an extremely poor weld appearance property, and was not a product which can be used as a high-grade molded product.

Comparative Example 24

A molded article was obtained in the same manner as in Example 33 except that 3.0 parts by weight of pulverized aluminum powder (average shape ratio 1/12, average particle diameter 90 μm) were added in place of the punched aluminum fine pieces used. The obtained molded article exhibited an appearance having a sufficient metallic feel, but having an extremely large blacking sufficient metallic feel, but having an extremely large blacking of the base hue and an extremely poor weld appearance property, and was not a product which can be used as a high-grade molded product.

The results obtained in Examples 24 to 34 above are shown in Table 5 below, and the results obtained in Comparative Examples 15 to 24 are shown in Table 6 below.

TABLE 5

| Example: | Resin | Material and shape | Metal fine pieces Average particle diameter (μm) | Average shape ratio | σ/x ratio | Amount added (parts by weight) | Weld appearance property | Metallic feel | Blacking base hue |
| --- | --- | --- | --- | --- | --- | --- | --- | --- | --- |
| 24 | PC/PET = 70/30 | Aluminum Square* | 283 | 1/10 | 0.01 | 1.0 | ⊚ | ○ | ⊚ |
| 25 | PC/PET = 70/30 | Aluminum Square* | 283 | 1/20 | 0.01 | 0.4 | ⊚ | ○ | ⊚ |
| 26 | PC/PET = 70/30 | Aluminum Square* | 283 | 1/90 | 0.01 | 1.0 | ⊚ | ⊚ | ⊚ |
| 27 | PC/PET = 70/30 | Aluminum Square* | 141 | 1/20 | 0.01 | 1.0 | ⊚ | ○ | ⊚ |
| 28 | PC/PET = 70/30 | Aluminum Square | 283 | 1/90 | 0.01 | 1.0 | ⊚ | ○ | ⊚ |
| 29 | PC/PET = 70/30 | Aluminum circle | 100 | 1/60 | 0.01 | 2.0 | ○ | ○ | ⊚ |

TABLE 5-continued

| | | | Metal fine pieces | | | | | | |
|---|---|---|---|---|---|---|---|---|---|
| Example: | Resin | Material and shape | Average particle diameter (μm) | Average shape ratio | σ/x ratio | Amount added (parts by weight) | Weld appearance property | Metallic feel | Blacking base hue |
| 30 | PC/PET = 70/30 | Stainless Square | 283 | 1/40 | 0.01 | 2.0 | ○ | ○ | ○ |
| 31 | PC/PET = 85/15 | Aluminum Square* | 141 | 1/20 | 0.01 | 1.0 | ⊙ | ○ | ⊙ |
| 32 | PC/PET = 30/70 | Aluminum Square* | 141 | 1/20 | 0.01 | 1.0 | ⊙ | ○ | ⊙ |
| 33 | PET = 100 | Aluminum Square* | 707 | 1/20 | 0.01 | 2.0 | ○ | ○ | ○ |
| 34 | PET/PBT = 30/70 | Aluminum Square* | 283 | 1/20 | 0.01 | 3.0 | ○ | ○ | ○ |

*Having a cut portion at one corner

TABLE 6

| | | | Metal fine pieces | | | | | | |
|---|---|---|---|---|---|---|---|---|---|
| Comparative Example: | Resin | Material and shape | Average particle diameter (μm) | Average shape ratio | σ/x ratio | Amount added (parts by weight) | Weld appearance property | Metallic feel | Blacking base hue |
| 15 | PC/PET = 70/30 | Aluminum Square* | 141 | 1/5 | 0.01 | 1.0 | ○ | ○ | Δ |
| 16 | PC/PET = 70/30 | Aluminum Square | 283 | 1/90 | 0.01 | 0.1 | ⊙ | x | ⊙ |
| 17 | PC/PET = 70/30 | Aluminum Square | 283 | 1/90 | 0.01 | 12.0 | Δ | ○ | Δ |
| 18 | PC/PET = 70/30 | Aluminum Square | 71 | 2/90 | 0.01 | 6.0 | Δ | ⊙ | Δ |
| 19 | PC/PET = 70/30 | Aluminum Square | 990 | 1/90 | 0.01 | 1.0 | ⊙ | x | ⊙ |
| 20 | PC/PET = 70/30 | Aluminum Pulverized Product | 90 | 1/12 | 0.29 | 0.2 | ○ | x | ⊙ |
| 21 | PC/PET = 70/30 | Aluminum Pulverized Product | 90 | 1/12 | 0.29 | 1.0 | Δ | Δ | Δ |
| 22 | PC/PET = 70/30 | Aluminum Pulverized Product | 55 | 1/10 | 0.43 | 1.0 | Δ | Δ | Δ |
| 23 | PC/PET = 70/30 | Aluminum Pulverized Product | 55 | 1/10 | 0.43 | 3.0 | x | ⊙ | x |
| 24 | PET = 100 | Aluminum Pulverized Product | 90 | 1/12 | 0.29 | 3.0 | x | ○ | x |

*Having a cut portion at one corner

It is apparent from the result of Comparative Examples 20 to 24 that where pulverized metal powder is used, a poor weld appearance, a poor metallic feel, or a blacking of the base hue causes, and such a molded article cannot be used as a high-grade molded product.

While the invention has been described in detail and with reference to specific examples thereof, it will be apparent to one skilled in the art that various changes and modifications can be made therein without departing from the spirit and scope thereof.

What is claimed is:

1. A synthetic resin composition comprising 100 parts weight of a thermoplastic resin and as a metallic pigment, from 0.2 to 5 parts by weight of lustrous metal particles having an average particle diameter of from 50 to 800 μm, and a ratio of a standard deviation of the particle diameter (g) to an average particle diameter (x), σ/x, of 0.1 or less.

2. The synthetic resin composition as claimed in claim 1, wherein the metallic pigment is lustrous metal fine pieces having an average particle diameter of from 50 to 800 μm, and an average shape ratio (thickness/average particle diameter) of from 1/100 to 1/8.

3. The synthetic resin composition as claimed in claim 1 or 2, wherein the metallic pigment is obtained by punching a metal foil.

4. The synthetic resin composition as claimed in claim 3, wherein the metallic pigment has a shape in which one corner of a polygon is cut.

5. The synthetic resin composition as claimed in claim 3, wherein the metallic pigment has a shape in which a part of the peripheral portion of a circle is cut.

6. The synthetic resin composition as claimed in claim 1 or 2 wherein the lustrous metal is aluminum.

7. The synthetic resin composition as claimed in claim 1 or 2 wherein the thermoplastic resin is polyester resin.

8. The synthetic resin composition as claimed in claim 7, wherein the thermoplastic type resin is a polycarbonate resin, polyethylene terephthalate resin, or a mixture thereof.

9. A synthetic resin pellet obtained by melt pelletizing the synthetic resin composition as claimed in claim 1 or 2.

* * * * *